United States Patent [19]

Mizuno et al.

[11] Patent Number: 5,141,201

[45] Date of Patent: Aug. 25, 1992

[54] VIBRATION DAMPING APPARATUS FOR TRANSPORTATION

[75] Inventors: Keiichiro Mizuno, Tokyo; Kazutomo Murakami, Yokohama; Kazuyoshi Iida, Iruma; Toshihiro Miyazaki, Yokohama; Yoji Suizu, Koganei; Nobuo Masaki, Tokorozawa, all of Japan

[73] Assignee: Bridgestone Corporation, Tokyo, Japan

[21] Appl. No.: 432,839

[22] Filed: Nov. 7, 1989

[30] Foreign Application Priority Data

Nov. 7, 1988 [JP] Japan .................. 63-279392
Feb. 23, 1989 [JP] Japan .................. 1-41740
Mar. 3, 1989 [JP] Japan .................. 1-49978

[51] Int. Cl.$^5$ .......................................... F16M 13/00
[52] U.S. Cl. ..................................... 248/550; 248/638
[58] Field of Search ............... 248/550, 562, 566, 636, 248/638, 581

[56] References Cited

U.S. PATENT DOCUMENTS

| 2,572,919 | 10/1951 | French et al. | 248/562 |
| 3,137,466 | 6/1964 | Rasmussen | 248/562 |
| 3,193,239 | 7/1956 | Monroe | 248/566 |
| 3,299,447 | 1/1967 | Dome | 5/118 |
| 3,469,809 | 9/1969 | Reznick et al. | 248/562 |
| 3,912,248 | 10/1975 | Pickford et al. | 248/562 |
| 4,101,102 | 7/1978 | Lloyd | 248/638 |
| 4,336,917 | 6/1982 | Phillips | 248/550 |
| 4,565,039 | 1/1986 | Oguro et al. | 248/636 |
| 4,638,983 | 1/1987 | Idigkeit et al. | 248/550 X |
| 4,679,759 | 7/1987 | Ford | 248/562 |
| 4,688,776 | 8/1987 | Lecour et al. | 248/562 |
| 4,713,714 | 12/1987 | Gatti et al. | 248/638 X |
| 4,744,539 | 5/1988 | Stimeling | 248/638 |
| 4,762,306 | 8/1988 | Watanabe et al. | 248/550 X |
| 4,881,712 | 11/1989 | Lun | 248/562 |
| 4,919,402 | 4/1990 | Doi | 248/562 X |

FOREIGN PATENT DOCUMENTS 1185228 7/1959 France .................. 248/562

Primary Examiner—Renee S. Luebke
Assistant Examiner—Michael J. Milano
Attorney, Agent, or Firm—Sughrue, Mion, Zinn, Macpeak & Seas

[57] ABSTRACT

A vibration damping apparatus for transportation includes a vertical direction damping device having air springs and air dampers arranged in parallel on a base and horizontal direction damping device having laminated rubbers. The vertical and horizontal damping devices are combined in series for supporting a load base. The apparatus further includes an air supply source for supplying air into the air springs, control valves provided between the air springs and the air supply source for controlling air supply into and exhaust from the air springs, displacement detecting device for detecting displacements of the load base relative to the bases, and control device for controlling the control valves on the basis of results detected by the displacement detecting device to maintain the load base horizontally and at a constant level relative to the base whatever load is loaded on the load base.

16 Claims, 12 Drawing Sheets

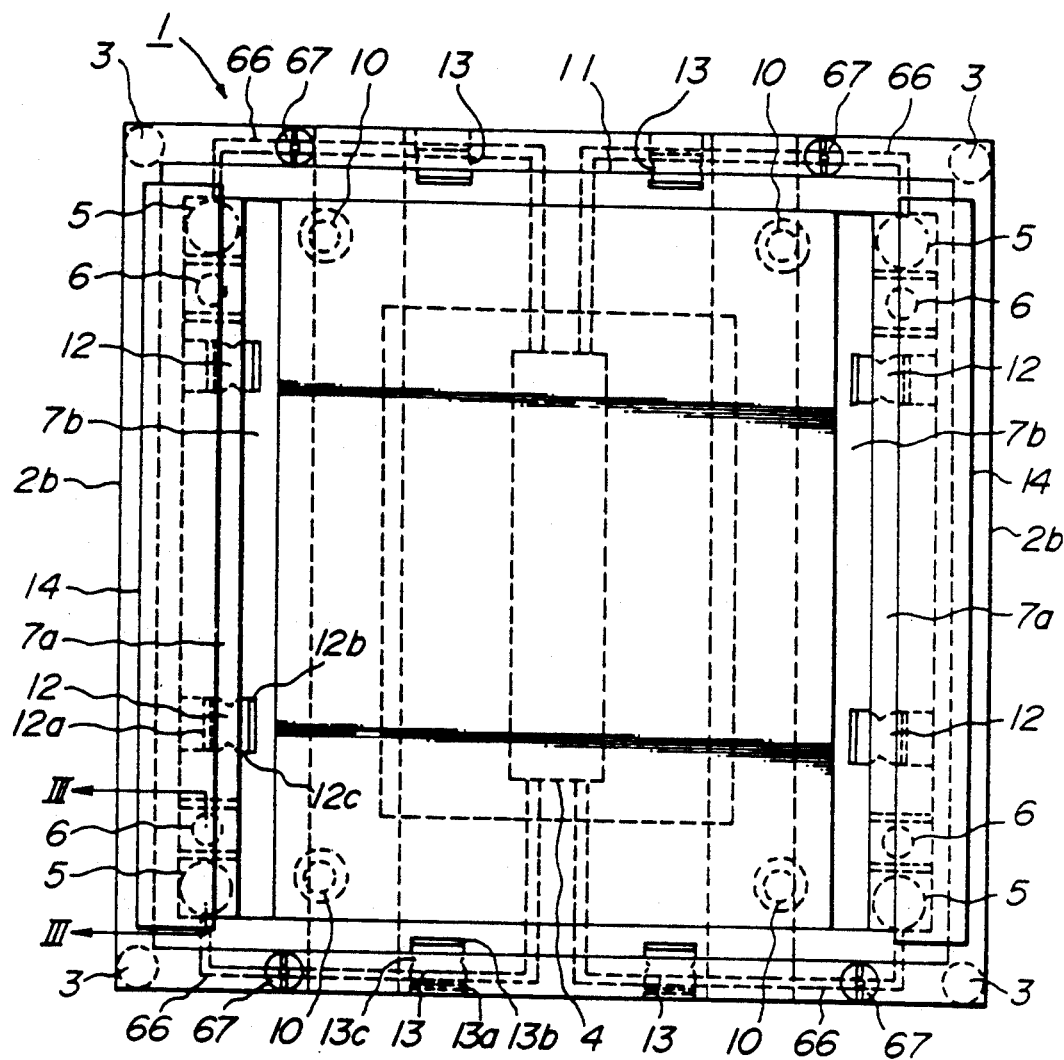
FIG_1
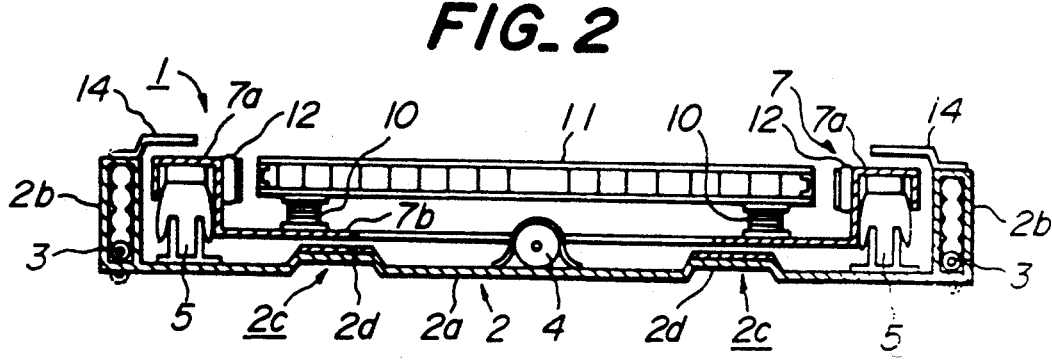
FIG_2

FIG_3
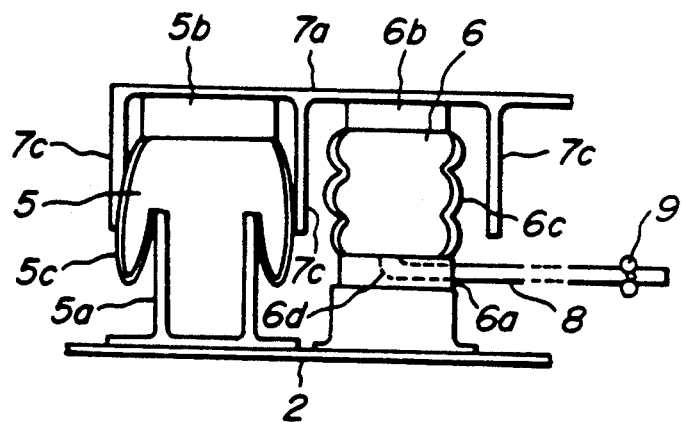
FIG_4
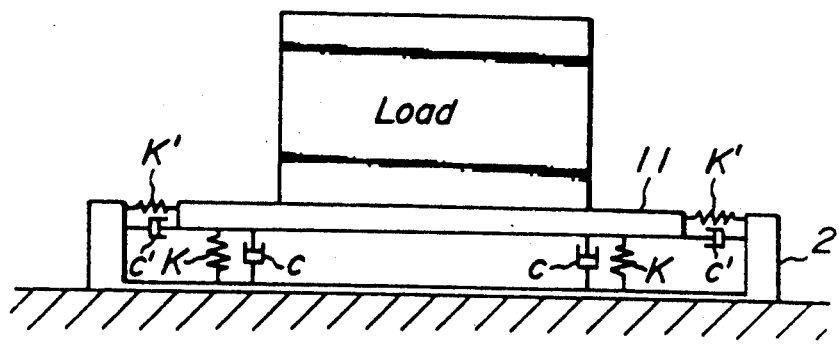

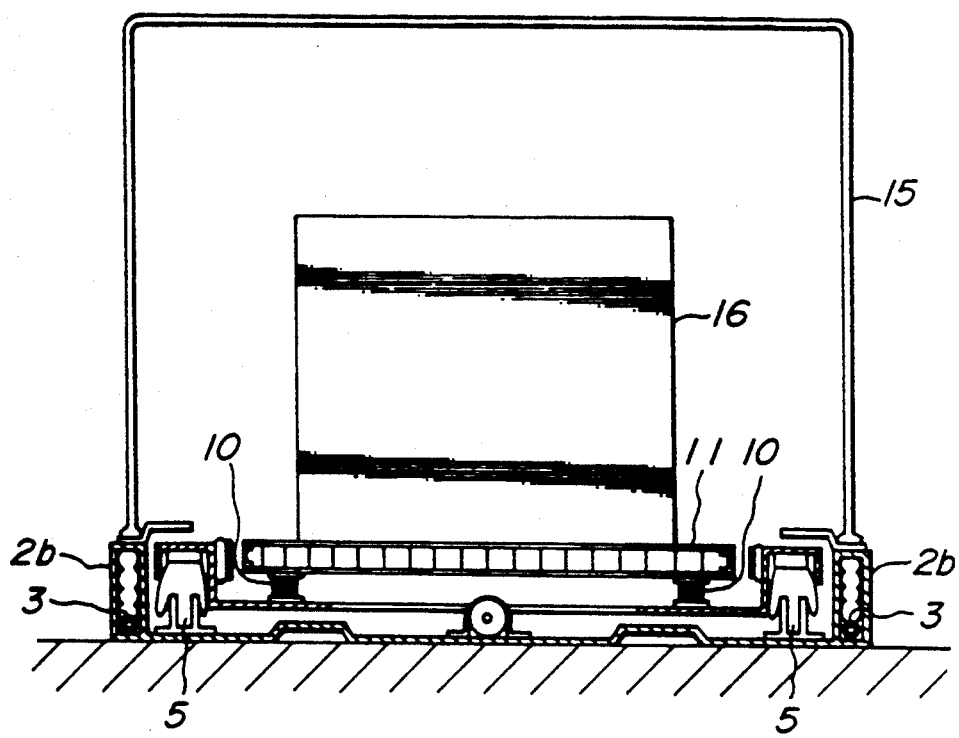
FIG._10
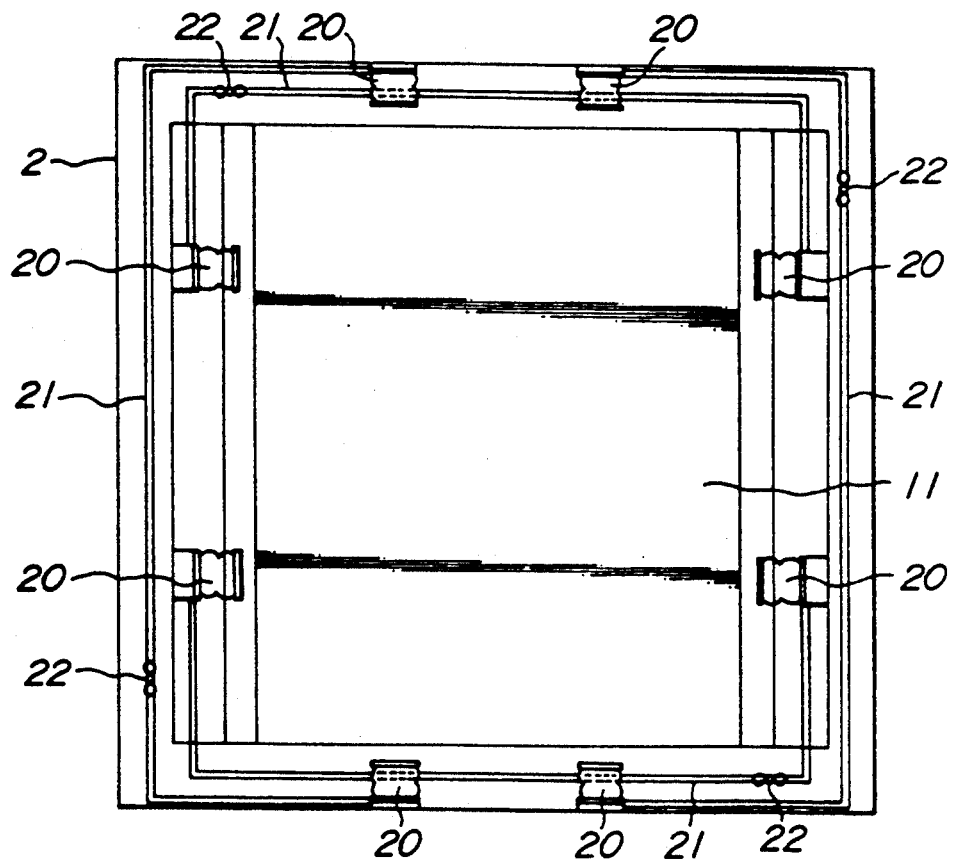
FIG._11

FIG.\_12
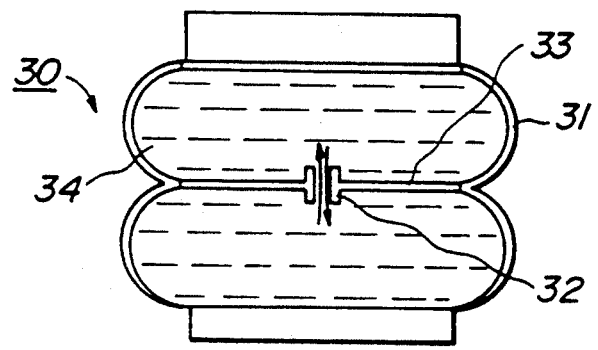
FIG.\_13
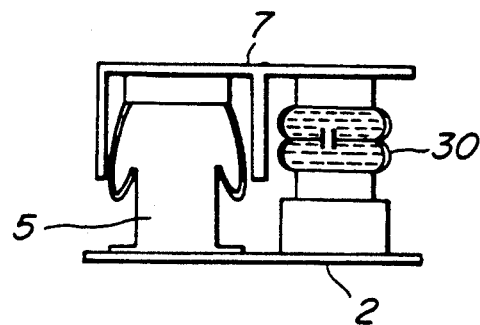
FIG.\_14
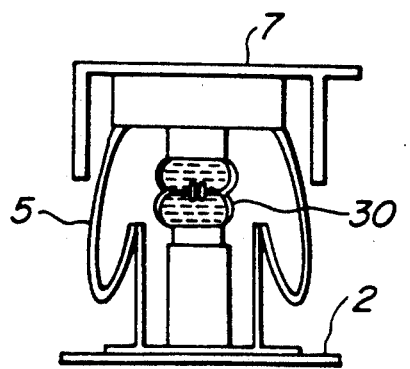

FIG_16
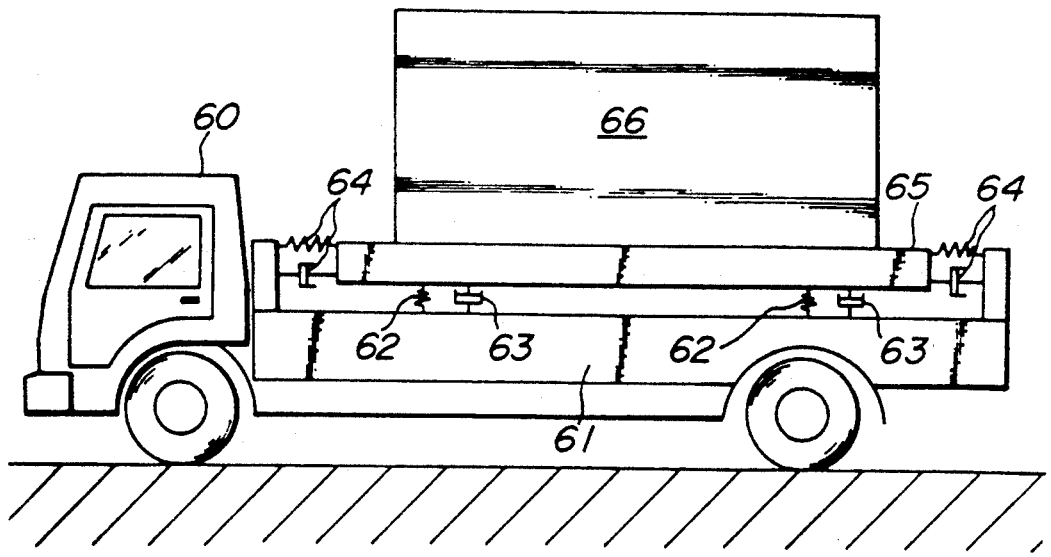

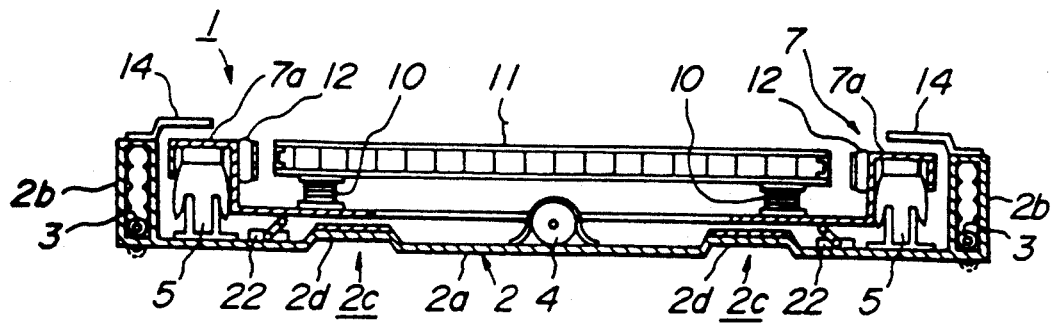
FIG_17
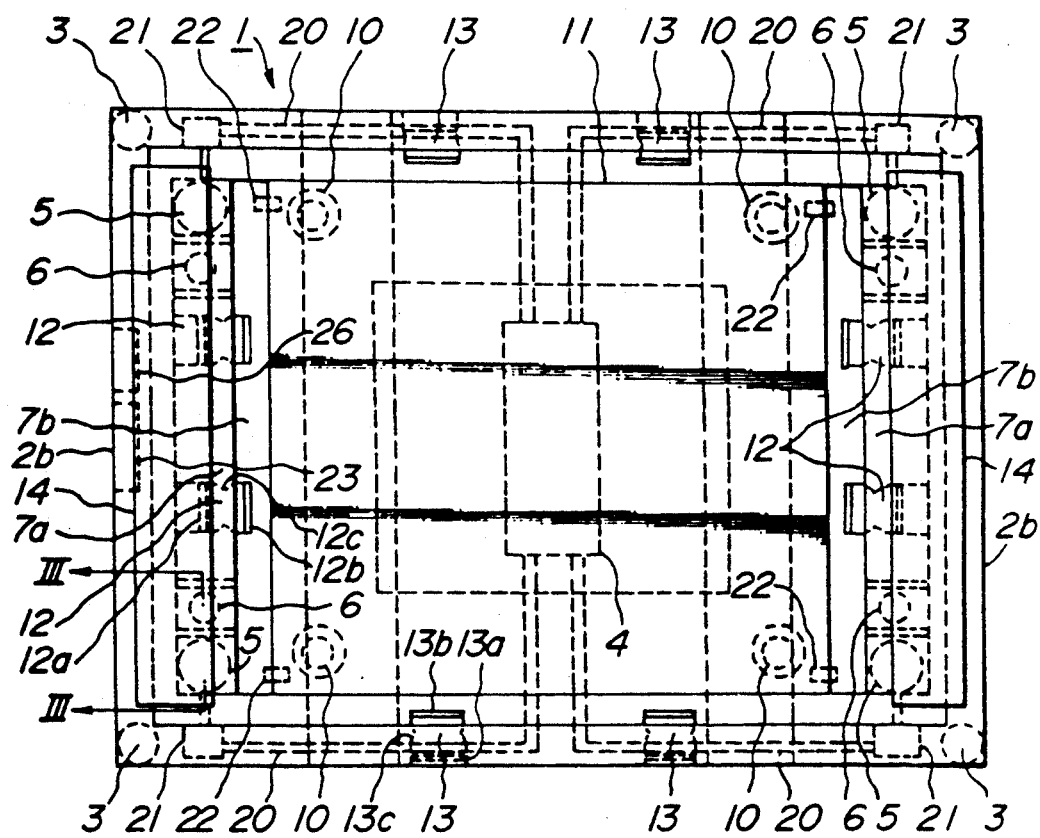
FIG_18

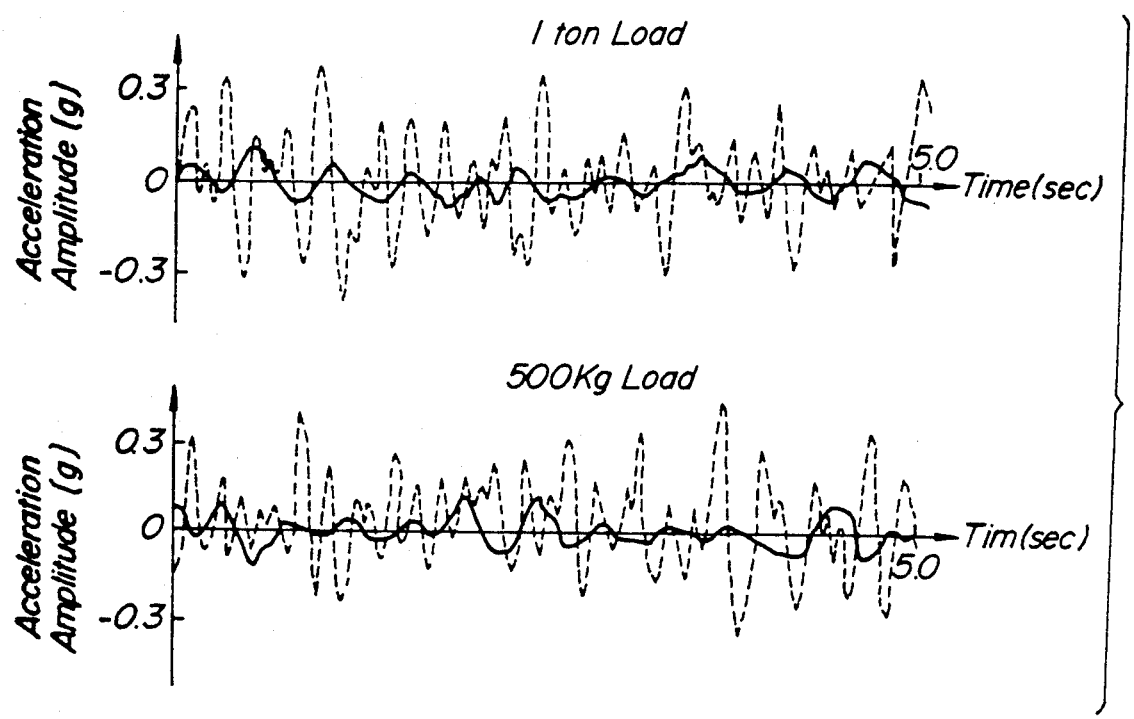
FIG_22

VIBRATION DAMPING APPARATUS FOR TRANSPORTATION

BACKGROUND OF THE INVENTION

This invention relates to a vibration damping apparatus for transportation, which damp vibrations acting upon articles transported by a vehicle to protect the articles in transportation.

Vibrations transmitted from a load base of a transporting vehicle to articles to be transported by the vehicle detrimentally affect the articles and give rise to various problems, and sometimes cause failures of the articles. A vibration damping apparatus effectively preventing the vibration have been expected.

In general, therefore, articles to be transported have been strictly packaged and transporting vehicles for the packaged particles have been driven with great care.

As the most simple method of damping the vibrations, articles to be transported have been strictly packaged by cushioning materials such as foamed styrol blocks, urethane foam blocks, corrugated boards, wood frames and the like.

Moreover, particularly specified air suspension vehicles equipped with damping devices have been used for transporting precision appliances.

In some cases, furthermore, wires have been used to hang articles in transporting vehicles as a primitive method of preventing the articles from being damaged by vibrations.

The method using the cushioning materials is relatively inexpensive. However, it involves troublesome and time consuming operations for packaging every article or arranging wood frames. Moreover, it often involves disassembling the articles before packaging in order to make easy the packaging.

In a case of using the particular air suspension vehicles, air pressure in the air suspension is needed to be adjusted dependent upon kinds of articles to be loaded thereon because damping effects greatly change according to shapes, weights, eccentricities of gravity centers and the like of the articles. However, the air adjusting operation is unexpectedly troublesome and hence seldom effected. Therefore, this system could not obtain expected results.

Moreover, air suspension vehicles usually do not exhibit the horizontal direction damping capacity and require much cost for modifying the vehicle frames for providing suspensions thereon. If providing horizontal direction damping capacity, it will greatly increase the initial cost.

In the method of hanging articles in transporting vehicles, there is a risk of the wires being subjected to excessive forces to be cut off on emergency braking.

SUMMARY OF THE INVENTION

It is an object of the invention to provide an improved vibration damping apparatus for transportation, which is inexpensive and is capable of easily carrying out loading operation and damping vertical and horizontal direction vibrations.

It is another object of the invention to provide a vibration damping apparatus for transportation, which always exhibits stable and optimum damping capacity irrespective of conditions of loaded articles by maintaining a load base horizontal and controlling it at a constant level relative to a base of a transporting vehicle with the aid of air springs.

In order to achieve the objects, the vibration damping apparatus for transportation according to the invention comprises vertical direction damping means including air springs and vibration damping means arranged in parallel on a base and horizontal direction damping means of laminated rubbers, said vertical and horizontal direction damping means being combined in series for supporting a load base.

When the vibration damping apparatus according to the invention is arranged on a vehicle and articles are loaded and fixed onto a load base of the apparatus, among vibrations transmitted to a base of the vehicle the horizontal vibrations are effectively damped by the laminated rubbers and vertical vibrations are effectively damped by the air springs and the vibration damping means.

According to the invention, a loading operation is easy without particular packagings and without requiring any modification of the transporting vehicle so that initial cost of the transporting vehicle can be decreased.

In a preferred embodiment of the invention, the base is used as a deck frame of a transporting vehicle, and a deck for a load is supported by the vertical and horizontal direction damping means combined in series on the deck frame.

Moreover, the base is provided with a cover integrally therewith to cover a space above the base so that it can be used as a container which has dust-proof and moisture-proof effects and may be provided with an air conditioner.

According to the invention the damping apparatus further comprises an air supply source for supplying air into the air springs, control valve means provided between the air springs and the air supply source for controlling air supply into and exhaust from said air springs, displacement detecting means for detecting displacements of the load base relative to the base, and control means for controlling said control valve means on the basis of results detected by the displacement detecting means to maintain said load base horizontally and at a constant level relative to said base whatever load is loaded on the load base.

The control means drives and controls the control valve means on the basis of information detected in the displacement detecting means to adjust the inner pressure in the air springs so that the level of the load base is maintained at a constant horizontally relative to the base of the vehicle. As a result, the required resonance frequency is invariably constant so that stable optimum damping is always automatically effected irrespective of conditions of a load on the load base.

The invention will be more fully understood by referring to the following detailed specification and claims taken in connection with the appended drawings.

BRIEF DESCRIPTION OF THE DRAWINGS

FIG. 1 is a plan view of one embodiment of a vibration damping apparatus for transportation according to the invention;

FIG. 2 is a sectional side view of the apparatus shown in FIG. 1;

FIG. 3 is a sectional view of the apparatus taken along a line III—III in FIG. 1;

FIG. 4 is a schematic view of the apparatus shown in FIG. 1;

FIG. 10 is a side sectional view of the vibration damping apparatus shown in FIG. 1 having a container cover attached thereto;

FIG. 11 is a plan view of an apparatus of another embodiment of the invention;

FIG. 12 is a sectional view illustrating a modification of a damper used in the invention;

FIG. 13 is a sectional view illustrating the damper shown in FIG. 12 arranged in parallel with an air spring according to the invention;

FIG. 14 is a sectional view illustrating the damper shown in FIG. 13 arranged in an air spring;

FIG. 16 is a schematic view illustrating a transporting vehicle incorporating the vibration damping apparatus according to the invention therein;

FIG. 17 is a sectional view illustrating a further embodiment of the damping apparatus according to the invention;

FIG. 18 is a plan view of the apparatus shown in FIG. 17;

FIG. 22 is a graph illustrating variations in acceleration amplitude in vertical directions.

EXPLANATION OF THE PREFERRED EMBODIMENTS

Figure 5:
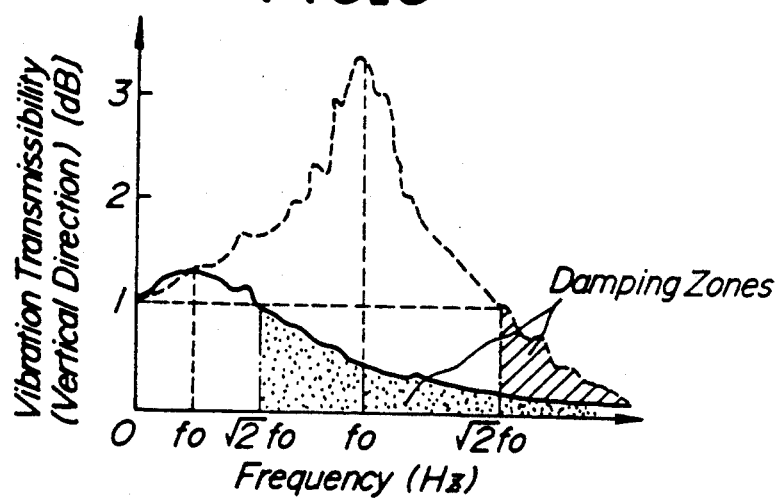
FIG. 5 is a graph illustrating relations between the vibration transmissibility and vibration frequency.

FIG. 1 is a plan view illustrating one embodiment of the vibration damping apparatus for transportation according to the invention and FIG. 2 is a longitudinal sectional view of the apparatus shown in FIG. 1.

A base 2 is in the form of a box including a rectangular bottom plate 2a having at four sides cylindrical side bodies 2b having a rectangular section.

The bottom plate 2a is formed with two parallel recesses 2c to form spaces into which forks of a forklift truck can be inserted when the base 2 is arranged on a flat surface.

The cylindrical side bodies 2b have at four corners of the base 2 extensible and contractible casters 3 built therein utilizing air springs. When air is supplied under pressure into the casters 3, they extend downwardly to support movably the base 2 on a flour.

An air tank 4 is fixed on an upper surface of the bottom plate 2a at its center for supplying air to air springs 5 described later and the casters 3.

The air springs 5 are fixed with their lower ends to the bottom plate 2a at the four corners. At the same time, air dampers 6 are fixed with their lower ends to the bottom plate 2a adjacent the air springs 5.

Upper ends of the air springs 5 and the air dampers 6 are fixed to an intermediate base 7 supported by the four air springs 5.

The intermediate base 7 is formed by a metal plate whose both sides are folded upwardly, further folded outwardly in horizontal directions, and thereafter folded downwardly to form U-shaped side bodies 7a whose openings face downwardly. The air springs 5 and the air dampers 6 are provided in the U-shaped side bodies 7a.

Upper surfaces of the side bodies 7a are positioned substantially at the same level as upper surfaces of the side bodies 2b of the base 2.

FIG. 3 is a sectional view taken along the line III—III of FIG. 1 and illustrates the air spring 5 and the air damper 6 provided in the U-shaped side body 7a of the intermediate base 7.

Each of the side bodies 7a of the intermediate base 7 is provided with a partition plate 7c to form two boxes opening downwardly, in which upper halves of the air spring 5 and the air damper 6 are fitted.

Each of the air springs 5 comprises a lower cylinder 5a under the box-shaped space, an upper end member 5b fixed to a ceiling of the box-shaped space, and a flexible bladder 5c provided to fill a space between the upper end member 5b and the lower cylinder 5a. The air is supplied into the air springs 5 from the air tank 4.

Therefore, the air springs 5 regulate horizontal relative movements between the base 2 and the intermediate base 7 to mainly serve to obstruct propagation of vibration in vertical directions.

On the other hand, each of the air dampers 6 comprises an upper end member 6b fixed with its upper edge to the side body 7a of the intermediate base 7, a lower end member 6a fixed with its lower edge to the base 2, and a cylindrical rubber body 6c fixed with its upper and lower edges to the upper and lower end members 6b and 6a. The lower end member 6a is formed with a communication aperture 6d communicating with an internal space of the flexible cylinder body 6c. The communication aperture 6d opens at a side surface of the lower end member 6a, on whose opened end is fitted one end of a conduit 8. The conduit 8 has one end opening outwardly and is provided in the proximity thereof with a valve 9 capable of adjusting its orifice diameter.

Therefore, the air dampers 6 serve to damp relative vertical vibrations between the base 2 and the intermediate base 7 by resistance of air at the orifice of the valve 9 when it is somewhat opened. The damping capacity is adjustable by adjusting the valve 9.

The intermediate base 7 is formed in its center flat plate portion with a rectangular hole. Laminated rubbers 10 are provided at four corners of a bottom plate 7b about the rectangular hole. A load base 11 in the form of a rectangular plate is supported by the laminated rubbers 10.

The load base 11 is of light weight and has a strong bending strength.

An upper surface of the load base 11 is positioned substantially at the same level as that of the upper surface of the side bodies 7a of the intermediate base 7 so that required spaces according to amplitudes of vibrations are formed between the right and left side faces of the load base 11 and side bodies 7a of the intermediate base 7 and between the front and rear side faces of the load base 11 and the front and rear side bodies 2b.

Two air dampers 12 are fixed to each of the right and left side bodies 7a at predetermined positions and two air dampers 13 are fixed to each of the front and rear side bodies 2b of the base 2 at predetermined positions. All the eight air dampers 12 and 13 extend directing toward side surfaces of the load base 11.

The air dampers 12 and 13 have the same construction as those of the air damper 6 and are adjustable in their damping capacities by valves.

Each of air dampers 12 provided to the intermediate base 7 has a bottom end member 12a fixed to an outer vertical wall of the side body 7a. Each of the dampers 12 has through a flexible cylinder body 12c a tip member 12b extending somewhat inwardly of a notch of an inner vertical wall of the side body 7a to form a suitable interval between the tip member 12b and each of the right and left side faces of the load base 11.

In the same manner, each of the air dampers 13 provided on the base 2 has a bottom end member 13a fixed to an outer vertical wall of the side body 2b. Each of the dampers 13 has through a cylindrical rubber body 13c a tip member 13b extending somewhat inwardly of a notch of an inner vertical wall of the side body 2b to form a suitable interval between the tip member 13b and each of the front and rear side faces of the load base 11.

Therefore, the load base 11 is supported with its bottom surface on the intermediate base 7 by the laminated rubbers 10 and is surrounded by the eight air dampers 12 and 13 provided in opposition to each other on the front and rear and right and left side faces.

Each of the laminated rubbers 10 comprises rubber layers and metal layers alternately laminated so that it exhibits a large rigidity in the vertical direction and is capable of supporting heavy weights. Each of the laminated rubbers 10 serves as a spring for vibrations in horizontal directions and further exhibits a vibration damping effect.

Therefore, vibrations of the intermediate base 7 in horizontal directions are absorbed by the laminated rubbers 10 to prevent the vibrations from transmitting to the load base 11. When there are vibrations whose amplitudes are large to a certain extent, the load base 11 abuts against the air dampers 12 and 13 to exhibit a larger vibration damping effect. Moreover, if an impact acts on the apparatus, the air dampers 12 and 13 exhibit a damping effect on the impact.

If a much larger horizontal input acts on the apparatus, the intermediate base 7 and the base 2 operate as stoppers.

Moreover, above each of the side bodies 7a of the intermediate base 7 there is an upper limit stopper 14 fixed with its one end to an upper surface of the side body 2b of the base 2 and extending above the side body 7a of the intermediate base 7 like an eaves. On the other hand, the recesses 2c of the base 2 are positioned under the bottom plate 7b of the intermediate base 7 and have buffer members 2d thereon which serve as lower limit stoppers so that excessive displacements between the intermediate base 7 and the base 2 are regulated and controlled. The upper limit stopper 14 may be partially provided.

As above described, the vibration damping apparatus 1 according to this embodiment exhibits the vibration damping effect against vertical vibrations of the base 2 by the air springs 5 and the air dampers 6 and the vibration damping effect against horizontal vibrations by the laminated rubbers 10.

Such effects are shown in a schematic view of FIG. 4. As shown in FIG. 4, a spring K and a damper c formed by the air springs 5 and the air dampers 6 serve to damp the vertical vibrations between the base 2 and the load base 11, while a spring K' and a damper c' formed by the laminated rubbers 10 (and the air dampers 6 in some cases) serve to damp the horizontal vibrations.

With respect to the vertical vibrations, a horizontal height or level of the load base 11 can be adjusted by individual pressures of the air supplied independently in the respective springs 5 from the air tank 4. The horizontal height of the load base 11 should be determined by a value of the resonance frequency $f_0$ to be determined.

A damping zone of a vibration frequency is the frequency zone whose frequencies are more than $\sqrt{2}$ times the resonance frequency $f_0$. Therefore, the damping zone becomes wider by setting the resonance frequency $f_0$ as low as possible.

Accordingly, the resonance frequency $f_0$ is usually set at a frequency of from 1 Hz to several Hz. In this embodiment, the resonance frequency $f_0$ is set by manually adjusting a supply valves 67 for adjusting the air supplied from the air tank 4 to the air springs 5.

When the inner pressure in the air spring is increased, a spring constant thereof is also increased in proportion to the increase of the inner pressure owing to the inherent characteristics of the air spring, and therefore, the resonance frequency corresponding to the spring constant is also increased.

Accordingly, the resonance frequency $f_0$ can be set at a desired value by adjusting the inner pressure in the air springs with the aid of the level of the load base adjusted by adjusting the valves.

For this purpose, the manually adjustable air supply valves 67 are provided in air pipings 66 connecting the air tank 4 and the air springs 5 arranged at the four corners of the apparatus. The valves 67 are adjusted to independently adjust the air supplied from the air tank 4 to the air springs 5 at the four corners.

As a result, levels of the air springs 5 at the four corners are independently adjustable, so that the resonance frequency $f_0$ which is determined by the relation between a load and the spring constants can be kept constant by adjusting the valves so as to keep the height of the load base constant, even if the load is varied. In other words, it is possible to control inherent values.

Although the valves are manually adjustable in this embodiment, air supply valves such as magnetic valves or the like may be automatically adjusted by an automatic controller with the aid of a displacement sensor for detecting levels of the load base.

In this manner, the resonance frequency $f_0$ is set at a low frequency value from 1 Hz to several Hz and a wide vibration damping zone wider than $\sqrt{2} f_0$ is ensured. On the other hand, a peak level of relative amplitudes at the resonance frequency $f_0$ is lowered to reduce a vibration transmissibility by means of the air dampers 6 arranged in parallel with the air springs 5, thereby obtaining a vibration damping effect in a zone near to the resonance frequency $f_0$.

FIG. 5 is a graph illustrating a relation between frequencies and vibration transmissibility in vertical directions, wherein solid lines show test results of the damping apparatus according to this embodiment. Broken lines show test results of an apparatus of the prior art whose load base is supported only by metal springs.

In this embodiment, by setting the resonance frequency $f_0$ of the air springs 5 at a low value as about 1 Hz, the damping area is enlarged to an area more than $\sqrt{2} f_0$ so that vibrations of a wide range can be damped.

In addition, the resonance frequency $f_0$ and the vibration transmissibility near thereto are restrained to low values with the aid of the air dampers 6.

Figure 6:
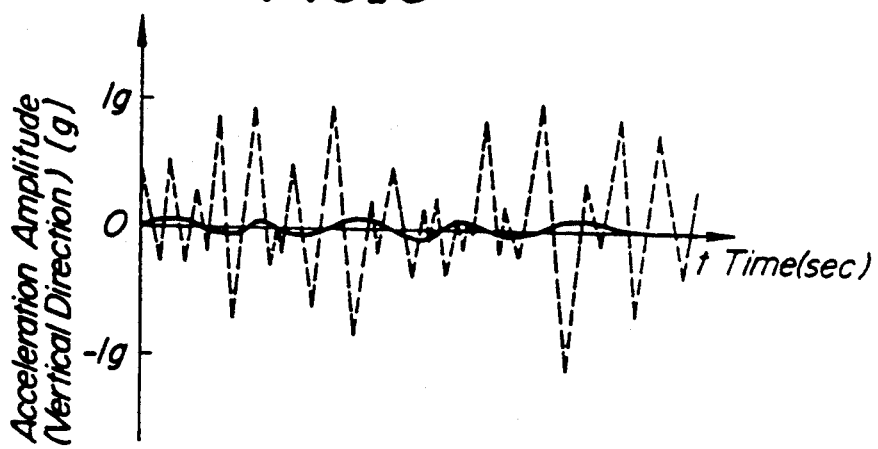
FIG. 6 is a graph illustrating acceleration amplitudes in vertical directions.

Moreover, acceleration amplitudes in vertical directions of the load base are considerably small in comparison with those of the prior art as shown in broken lines in FIG. 6.

Figure 7:
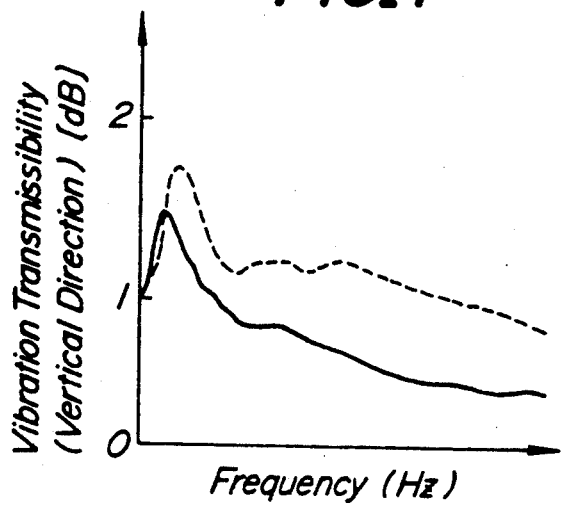
FIG. 7 is a graph illustrating relations between the vibration transmissibility and vibration frequency.

FIG. 7 illustrates a result in comparison of difference in vibration transmissibility between cases of an apparatus of the prior art arranged on a vehicle having an air suspension (shown in broken lines) and an apparatus according to the embodiment arranged on a vehicle having no air suspension (shown in solid lines).

As can be seen from the graph in FIG. 7, the apparatus according to the invention exhibits a great damping effect wherein the vibration transmissibility is much smaller in all frequency areas except very low frequency areas.

Moreover, when an excessive input vibration in vertical directions is applied to the base 2 by large impact vibrations and the like, the air dampers 6 effectively exhibit vibration damping effects.

When much larger input vibrations are applied to the base 2, the air dampers 6 damp the vibrations and then the stoppers 14 and the buffer members 2d attached to the recesses 2c of the base 2 regulate displacements of the intermediate base 7.

Concerning the horizontal vibrations, the laminated rubbers 10 exhibit the vibration damping effect. The laminated rubbers 10 according to this embodiment are so designed to determine the compositions and the number of the laminated layers so as to cause the resonance frequency $f_0$ to be of the order of 1 Hz when the maximum load is applied thereto.

At the same time, the composition of the rubber is designed so as to obtain a high damping characteristics. The laminated rubbers 10 themselves have a performance enabling the peak level to be lowered at the resonance frequency $f_0$.

Figure 8:
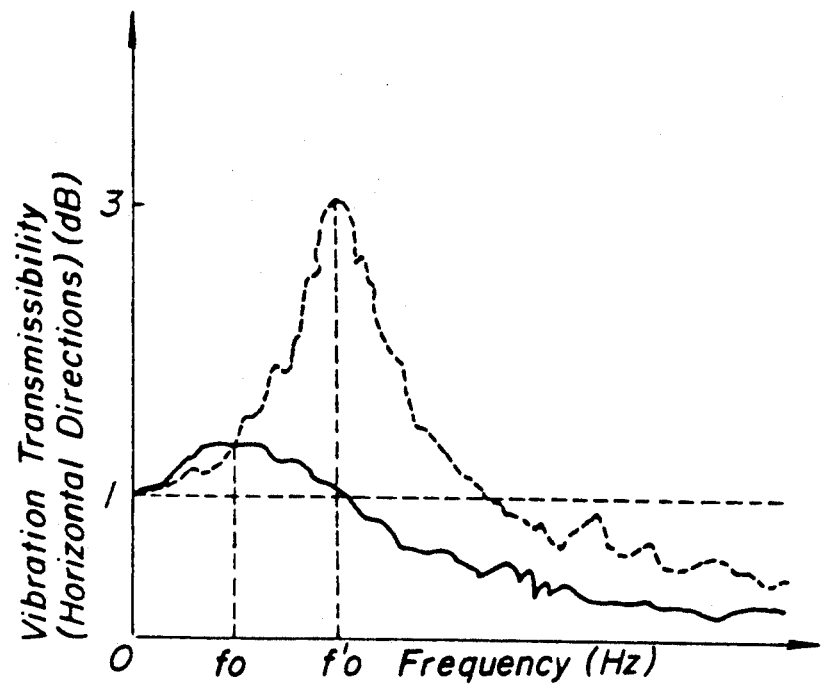
FIG. 8 is a graph illustrating relations between the vibration transmissibility in vertical directions and frequency.

FIG. 8 illustrates a relation between the vibration transmissibility in horizontal directions and frequencies showing results of the apparatus according to the invention in solid lines and results of the apparatus of the prior art in broken lines.

In comparison with the apparatus of the prior art, the vibration damping apparatus according to the invention has a resonance frequency $f_0$ set to a low value as about 1.5 Hz to enlarge the damping zone and to exhibit low vibration transmissibility at the resonance frequency $f_0$ and in an area near to the resonance frequency $f_0$.

Figure 9:
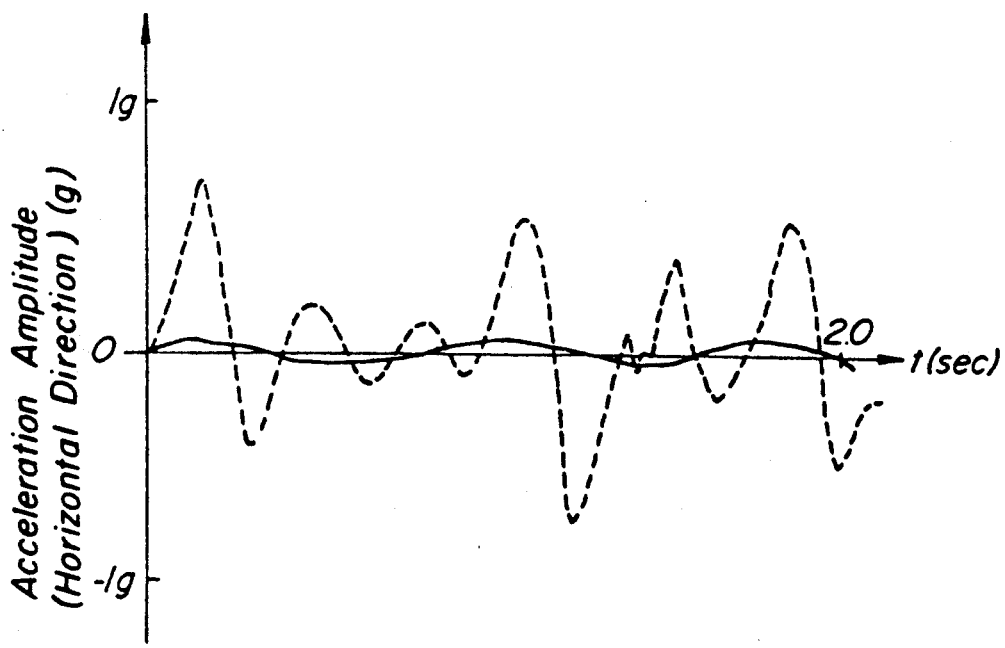
FIG. 9 is a graph illustrating acceleration amplitudes in vertical directions.

With acceleration amplitudes in vertical directions at the load base, in comparison with the apparatus of the prior art (in broken lines), the apparatus according to the invention exhibits considerably small acceleration amplitudes (in solid lines) in FIG. 9.

If excessive input vibrations are applied in horizontal directions, the high damping capacity of the laminated rubbers 10 serve to damp the vibrations. In the event that a more excessive input is applied, the dampers 12 and 13 are brought into contact with the load base 11 to exhibit the damping effect by the air dampers 12 and 13.

If a much more excessive input is applied, the side bodies 2b and 7b of the base 2 and the intermediate base 7 serve as stoppers in horizontal directions.

As above described, the vibration damping apparatus 1 for transportation according to the invention exhibits a significant damping effect against all random input vibrations acting upon the base 2 to say nothing of vibrations in vertical and horizontal directions so that the damping apparatus according to the invention is a damping apparatus serving in all directions.

Moreover, even if the weight of loads are changed, the damping capacity can be kept constant by adjusting the air pressure in the air springs 5 so that the apparatus according to the invention can be used for loads of various weights.

Therefore, when machines are assembled and adjusted in factories, disassembling for packaging the machines are not needed. It is possible to transport the machines by arranging them on the vibration damping apparatus 1 for transportation as they ar without disassembling.

In the apparatus according to the invention, as above described the base 2 is formed in its lower surface with two recesses 2c so that forks of a forklift truck can be easily inserted into the recesses 2c to ensure easier loading and unloading of loads.

If required, moreover, the air is supplied from the air tank 4 into the air springs of the extensible and contractible casters 3 to extend the casters 3 from the bottom surface of the base 2. Therefore, any load can be readily moved in a convenient manner.

If the damping apparatus 1 is made in a size to cover all of a deck of a transporting vehicle, it provides an inexpensive deck having a damping capacity superior to a vehicle having air suspensions.

Even if an occupied area of the damping apparatus 1 is smaller than that of a deck of the transporting vehicle, a plurality of the apparatuses are arranged on the deck to obtain the same effect.

As shown in FIG. 10, moreover, the damping apparatus according to the invention may be covered by a container cover 15 to prevent any dust and moisture from entering loads 16 in the cover 15. An air conditioner can be provided on the apparatus. In this manner, it is possible to provide an inexpensive vibration damping apparatus for transportation.

Concerning air dampers in horizontal directions, another embodiment will be explained by referring to FIG. 11.

The air dampers 12 and 13 of the first embodiment independently have a construction shown in FIG. 3. In contrast herewith, in this embodiment two opposed air dampers 20 are connected by a conduit 21 which is provided at its midportion with a valve 22. The valve 22 is used as an orifice. Air dampers capable of adjusting vibration damping capacities are provided in this manner.

With this embodiment, it is possible to have a more effective damping capacity, and since the air dampers 20 do not communicate with atmosphere so that moisture does not enter the air dampers 20, thereby maintaining the high damping capacity for a long period.

FIG. 12 illustrates a modification of the dampers. The damper 30 can be used as a damper against vibrations in horizontal and vertical directions. An air spring member 31 is divided by a partition wall 33 having an orifice 32 into an upper and a lower space in which a liquid 34 is enclosed.

According to change in volume of the upper and lower spaces, the liquid 34 moves through the orifice 32 between the two spaces, so that vibration damping forces are obtained from flow resistances of the liquid through the orifice 32.

The orifice may be spiral or of other shapes in order to elongate its length.

As shown in FIG. 13. the dampers 30 may provided in parallel with the air springs 5. As an alternative, they may be provided in respective air springs 5 as shown in FIG. 14.

Figure 15:
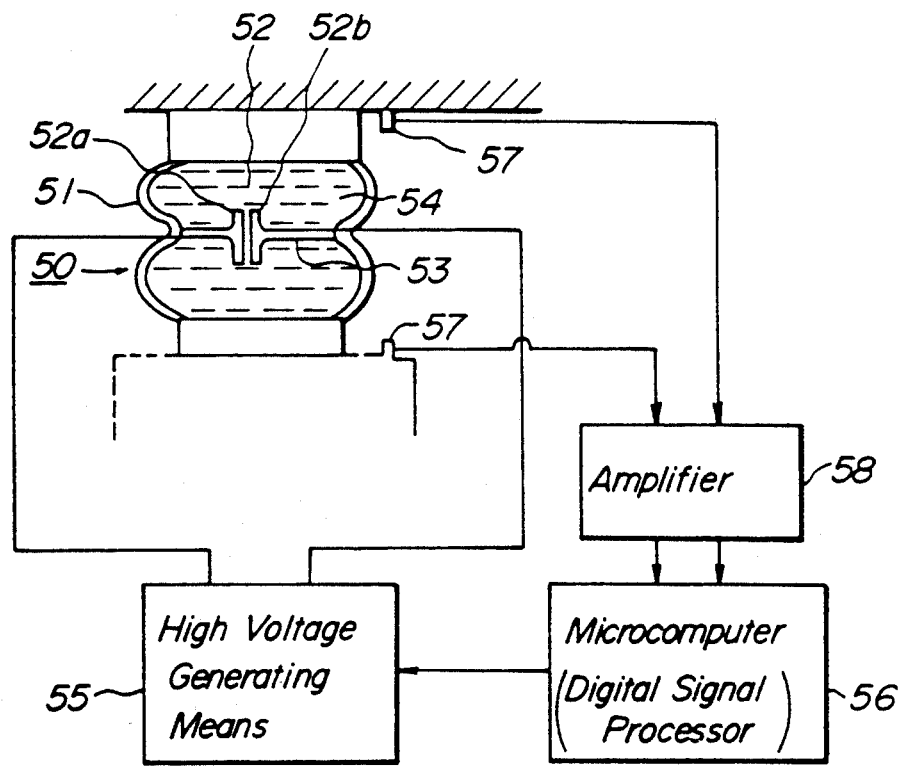
FIG. 15 is an explanatory view illustrating a modification of the damper.

A further modification of the damper is shown in FIG. 15. An air spring member 51 is divided by a partition wall 53 having an orifice 52 into an upper and lower space in which an electro-rheological fluid (ER liquid) 54 is enclosed. The orifice is made of a pair of electrodes 52a and 52b to which high electric voltage is applied from a high voltage generating means 55.

Output voltages of the high voltage generating means 55 are controlled by the microcomputer 56 into which detected signals are inputted through an amplifier 58 from a vibration sensor 57 for detecting vibrations applied to the base 2.

The ER liquid 54 used in this case is able to change its viscosity resistance instantaneously in response to change in applied voltage. When any electric voltage is not applied, the viscosity of the ER liquid 54 is low like water, while as electric voltage is applied step by step, the viscosity is successively increased to solidification. Such a change in viscosity is reversible and also superior in response.

Therefore, by adjusting the electric voltage to be applied to the electrodes 52a and 52b the viscosity of the ER liquid 52 passing through the orifice 52 is freely changed to obtained a suitable damping capacity.

The microcomputer 56 receives from the vibration sensor 57 an information of vibrations applied to the base 2 and calculates electric voltages to be applied for the purpose of obtaining a suitable viscosity of the ER liquid 54 at the orifice 52, and thereafter outputs an indicating signal into the high voltage generating means 55.

The high voltage generating means 55 applies a voltage instructed by the indicating signal to the orifice 52 so that the damper 50 always obtains the optimum damping capacity. The microcomputer 56 may be a digital signal processor.

If the damper 50 according to this embodiment is used as a damping device in vertical and horizontal directions, the optimum vibration damping control is possible corresponding to input vibrations.

Moreover, other dampers may be applicable to the apparatus according to the invention such as cylinder type oil dampers generally used, dampers utilizing univibration members, magnetic dampers using magnetic fluids and the like.

Furthermore, a particularly specified transporting vehicle incorporating therein the vibration damping apparatus according to the invention may be considered. For example, as shown in FIG. 16 a deck frame 61 of a transporting vehicle 60 is used as a base and a deck 65 is supported by air springs 62, air dampers 63 and laminated rubbers 64 on the deck frame 61.

In this manner, the optimum vibration damping effect is obtained depending an the weight of the load 66 on the deck 65 to provide a vehicle having on the entire deck the damping capacity superior to a vehicle having suspensions of the prior art.

The apparatus according to the invention comprises vertical direction damping means having air springs and vibration damping devices arranged in parallel readily accepting change in load weight to absorb vertical vibrations to a large extent, and horizontal direction damping means made of laminated rubbers to absorb horizontal vibrations effectively. The apparatus according to the invention can easily carry out loading operations without requiring troublesome packaging operations.

By arranging the apparatus according to the invention in a manner covering a deck of an existing transporting vehicle, the deck becomes an inexpensive load deck having vibration damping performance without modification of the vehicle.

Moreover, by incorporating vertical and horizontal vibration damping means in a deck frame of a transporting vehicle to support a deck to make a particularly specified vehicle, the entire deck of the transporting vehicle is given superior damping performance dependent upon load weights.

Furthermore, by covering a space above a deck, it can be used as a container to provide dust-proof and moisture-proof effects. If required, an air conditioner may be provided on the container.

FIGS. 17 and 18 illustrate a further embodiment of the apparatus according to the invention, which is slightly different from that shown in FIGS. 1 and 2. Different constructions and functions from those of the embodiment shown in FIGS. 1 and 2 will be explained.

Each of air pipings 20 connecting each of air springs 5 and an air tank 4 is arranged a cylindrical side body 2b of a base 2 and is provided with an electromagnetic valve 21.

The electromagnetic valve 21 is a switch-over valve capable of switching-over the suction for supplying the air into the air spring 5 and exhaust for forcing the air from the air spring 5.

A displacement sensor 22 adjacent each of the air springs 5 is fixed to the base 2 and has a movable portion whose tip end is always urged so as to abut against a lower surface of an intermediate base 7. Therefore, heights of four corners of the intermediate base 7 relative to the base 2 can be independently detected by the four displacement sensors 22.

The air springs 5 support the intermediate base 7 at its four corners and are independently adjusted with their air pressure. Therefore, even if a center of gravity of a load is eccentric to the load itself, the load base 11 can be kept at a constant height in a horizontal position.

A control board 23 is provided in the cylindrical body 2b of the base 2 for controlling the electromagnetic valves 21, and a chargeable battery 26.

Figure 19:
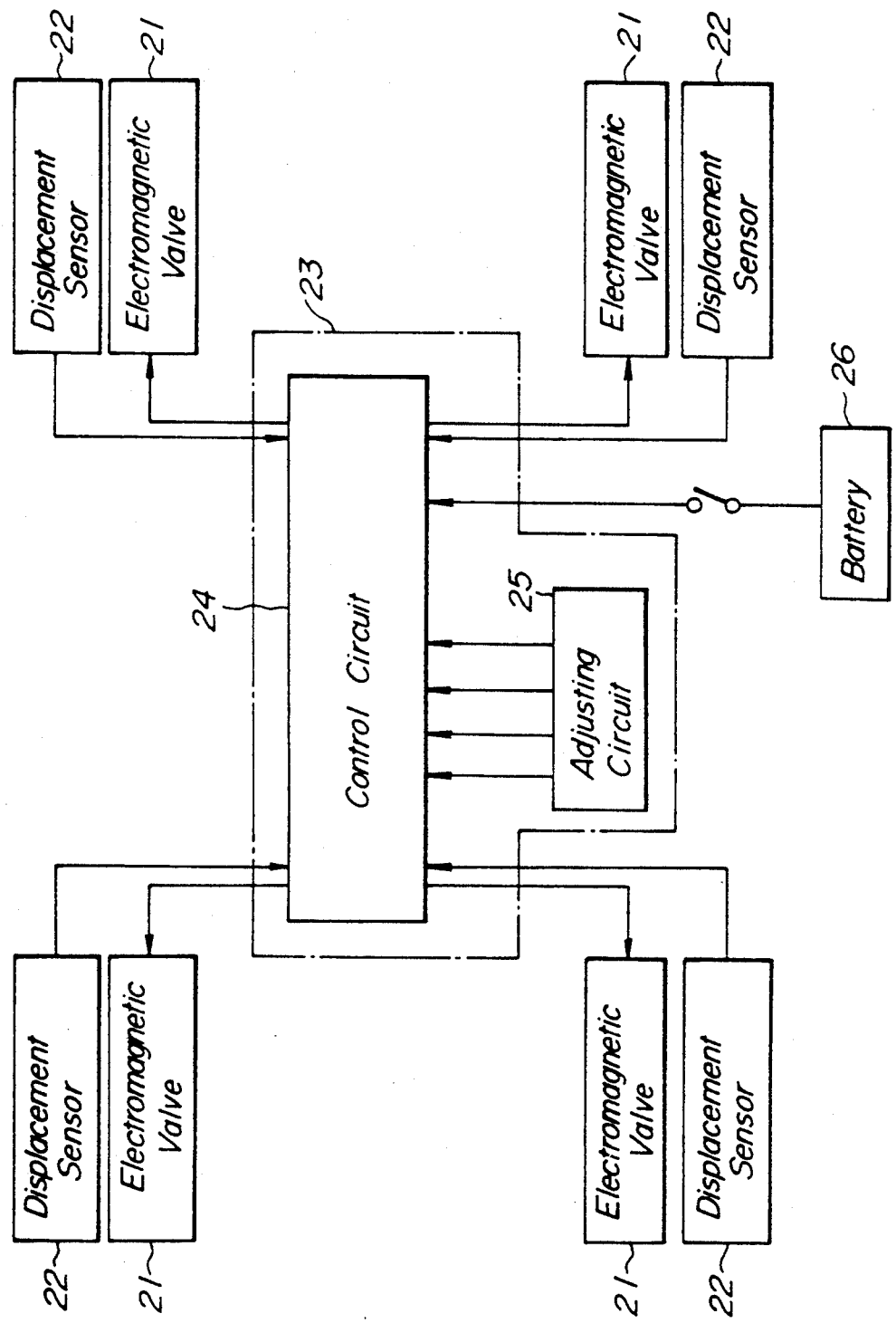
FIG. 19 is a block diagram of a control system of the apparatus shown in FIG. 17.

FIG. 19 is a schematic block diagram illustrating a control system for the damping apparatus shown in FIGS. 17 and 18. The control board 23 consists of a control circuit 24 and an adjusting circuit 25. The detected signals are inputted from the four displacement sensors 22 into the control circuit 24 which in turn outputs driving signals into the respective electromagnetic valves 21. The control circuit is supplied with power from the chargeable battery 26.

The adjusting circuit 25 serves to adjust a standard value of the height of the intermediate base 7 relative to the base 2. The standard value can be changed by external screw adjustment.

The control circuit 24 compares the detected value of height of the intermediate base 7 inputted from the respective displacement sensors 22 with the standard value set by the adjusting circuit 25 and outputs control signals into the respective electromagnetic valves 21. This causes all the detected values to be coincident with the standard value.

If the detected value of one corner of the intermediate base 7 is lower than the standard value, the corresponding electromagnetic valve 21 is driven onto a suction side so that the air is supplied from the air tank 4 into the corresponding air spring 5 to raise the one corner of the intermediate base 7. On the other hand, if the detected value is higher than the standard value, the electromagnetic valve 21 is driven onto an exhaust side so that air is removed from the corresponding air spring 5 to lower the corner of the intermediate base 7.

The heights of the four corners of the intermediate base 7 are independently controlled so as to be coincident with the standard value. At the moment when all the heights are coincident with the standard value, the respective electromagnetic valves 21 are locked so as to hermetically enclose the air in the air springs 5.

Therefore, the load base 11 can always be kept horizontally at a constant height, irrespective of a weight and a position of a gravity center of the load. Accordingly, by setting the resonance frequency at a predetermined low value, a stable good damping effect can be obtained irrespective of a load condition.

Figure 20:
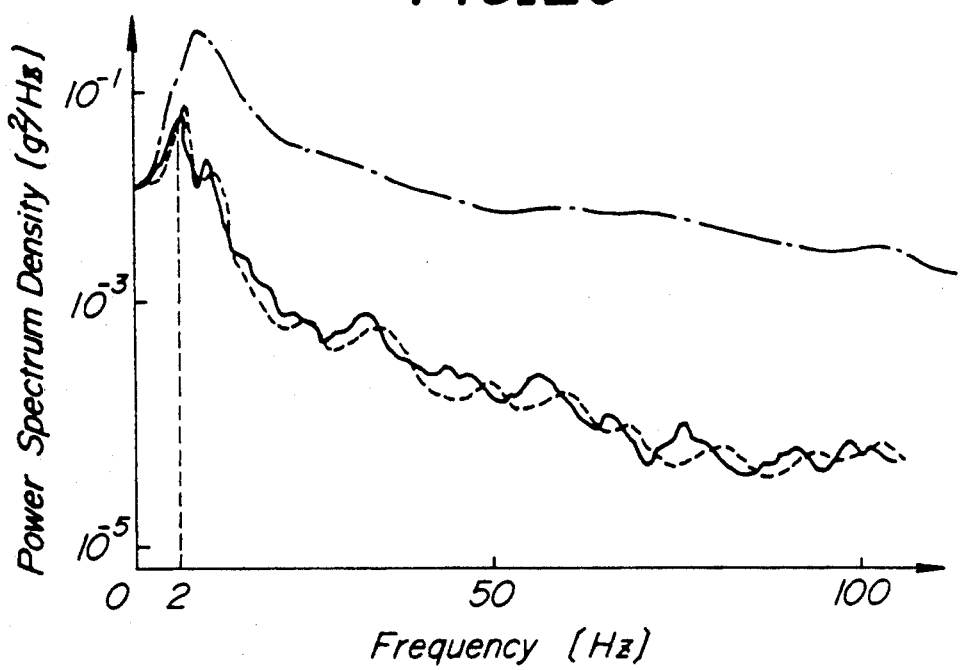
FIG. 20 is a graph illustrating a relation between the power spectrum density and frequency.
Figure 21:
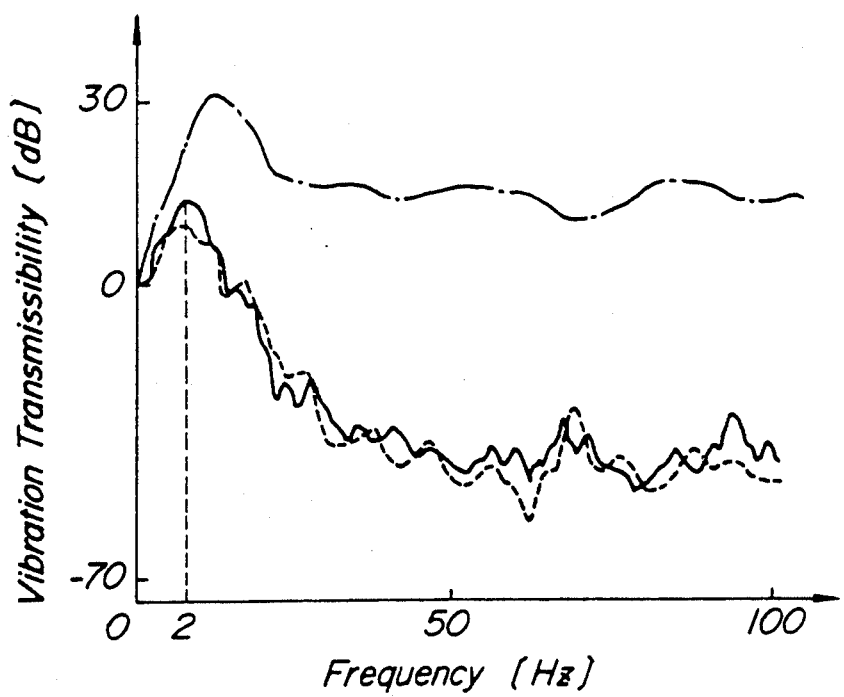
FIG. 21 is a graph illustrating a relation between the vibration transmissibility and frequency.

FIGS. 20, 21 and 22 illustrate result of an experiment in which the damping apparatus 1 for transportation according to this embodiment was arranged on a transporting vehicle which was loaded with articles of different weights and ran on a good road (concrete road).

FIG. 20 illustrates power spectrum density of vibration acceleration of one point of an article loaded on the apparatus. A result of load of a 1 ton is shown in solid lines and 500 kg in broken lines. A result without the damping apparatus is in dot-and-dash line.

Vibrations transmitted through wheels to the load are substantially constant irrespective of weights of loads, the power spectrum density is substantially similar values irrelevant to the weights of the loads.

As can be seen from the graph, very significant damping effects are obtained in both cases of 500 kg and 1 ton in comparison with the case without using the damping apparatus of the invention.

Peak values of the power spectrum density are substantially constant 2 Hz in any loads.

FIG. 21 illustrates vibration transmissibilities between the deck of the transporting vehicle and the loads on the damping apparatus 1. Solid, broken and dot-and-dash lines are results of the cases of 1 ton, 500 kg and without using the damping apparatus. It has been found from FIG. 21 that significant damping effect can be obtained.

Resonance frequencies are substantially constant 2 Hz and damping areas are wide (frequency area more than $2\sqrt{2}$ Hz) and stable irrespective of the weights of the loads.

FIG. 22 illustrates change in acceleration amplitude of one point on each of loads. An upper and a lower graph are in case of 1 ton and 500 kg.

Solid lines of the case using the damping apparatus according to the invention show small amplitudes in any loaded condition in comparison with the cases without using the damping apparatus. The extents of reduction in amplitude are substantially equal.

As can be seen from the results of the experiment, the stable constant vibration damping effect can always be obtained by keeping the height of the load base. Moreover, the load base can be kept horizontal irrespective of positions of centers of gravity of loads. Therefore, even with a load of a high center of gravity, rocking movements of an upper portion of the load can be restrained to prevent falling down of the load, thereby preventing any failure such as damage of the load.

Instead of the air dampers used in the embodiments, other damping devices can be used such as devices using rubber having a viscosity, urethane foam having a viscosity, and auxiliary tank.

According to the invention, vertical vibrations are damped by air springs and vibration damping devices and horizontal vibrations are damped by laminated rubbers. Moreover, with the vertical vibrations, by adjusting the inner pressure the load base is kept horizontal irrespective of conditions of loads and by controlling the height of the load base constant, the stable good damping effect can always be obtained.

In this case, the horizontal vibrations are damped by the laminated rubbers whose spring rigidity in vertical directions is extremely large. Therefore, the attachment of the laminated rubbers do not detrimentally affect the vertical vibration damping.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A vibration damping apparatus for transportation comprising; a base, a load base and an intermediate base; horizontal direction damping means including laminated rubbers fixed at their lower ends to upper portions of said intermediate base and at their upper ends to lower portions of said load base, vertical direction damping means including sets each including an air spring and an air damper arranged in parallel, each of said sets fixed at their upper ends to lower portions of the intermediate base and at their lower ends to upper portions of said base, an air supply source for supplying air into the air springs, control valve means provided between the air springs and the air supply source for controlling air supply into and exhaust from said air springs, displacement detecting means for detecting displacements of the load base relative to the base, and control means for controlling said control valve means on the basis of results detected by the displacement detecting means to maintain said load base horizontally and at a constant level relative to said base whatever load is loaded on the load base.

2. A vibration damping apparatus as set forth in claim 1, wherein said base is used as a deck frame of a transporting vehicle, and a deck for a load is supported by said vertical and horizontal direction damping means combined in series on said deck frame.

3. A vibration damping apparatus as set forth in claim 1, wherein each of said air springs comprises a lower cylinder under a box-shaped space in said intermediate base, an upper end member fixed to a ceiling of the box-shaped space, and a flexible bladder provided to fill a space between an upper member and a lower member of the air spring.

4. A vibration damping apparatus as set forth in claim 1, wherein each air damper comprises upper end member fixed with its upper edge to a portion of said intermediate base, a lower end member fixed with its lower edge to the base, and a cylindrical rubber body fixed with its upper and lower edges to said upper and lower members, and further comprises damping capacity adjusting means for adjusting a damping capacity of the air damper.

5. A vibration damping apparatus as set forth in claim 1, wherein each of the laminated rubbers comprises rubber layers and metal layers alternately laminated.

6. A vibration damping apparatus as set forth in claim 1, wherein said base is provided with a cover integrally formed therewith to cover a space above the base.

7. A vibration damping apparatus as set forth in claim 1, wherein each of the air dampers comprises an air spring member divided by a partition wall having an orifice into an upper and a lower space in which a liquid is enclosed.

8. A vibration damping apparatus as set forth in claim 7, wherein each of the air dampers is arranged in parallel with each of said air springs.

9. A vibration damping apparatus as set forth in claim 7, wherein each of the air dampers is arranged in each of said air springs.

10. A vibration damping apparatus as set forth in claim 7, wherein each of the air damper comprises an air spring member divided by a partition wall having an orifice made of a pair of electrodes into an upper and a lower space in which an electro-rheological fluid is enclosed.

11. A vibration damping apparatus as set forth in claim 10, wherein said air damper comprises high voltage generating means for applying high voltage to the electrodes, and a microcomputer controlling output voltage of the high voltage generating means and receiving vibration informations of the base from a vibration sensor through an amplifier.

12. A vibration damping apparatus as set forth in claim 1, wherein said control means comprises an adjusting circuit for adjusting a standard value of a height of an intermediate base of the base and a control circuit for receiving signals of heights of the intermediate base detected in the displacement detecting means and comparing the received signals with the standard value set in the adjusting circuit to output control signals into said control valve means to cause all the detected values to be coincident with the standard value.

13. The vibration damping apparatus as set forth in claim 1, wherein said air dampers are horizontally arranged between said surfaces of the load base and peripheral side walls formed on the intermediate base.

14. The vibration damping apparatus as set forth in claim 13, further comprising an electromagnetic valve arranged in an air supply pipe connecting the air spring to an air tank, and a displacement sensor arranged adjacent to the air spring and connected to the electromagnetic valve to detect the height of the intermediate base relative to the base and output a signal controlling the electromagnetic valve.

15. A vibration damping apparatus as set forth in claim 13, wherein two opposed air dampers are connected by a conduit which is provided at its midportion with a valve serving as an orifice.

16. The vibration damping apparatus as set fourth in claim 1, wherein said base is a deck frame of a transporting vehicle.

* * * * *